W. B. GRIFFIN.
BUILDING COMPONENT.
APPLICATION FILED APR. 30, 1918.
1,381,823.
Patented June 14, 1921.
2 SHEETS—SHEET 1.
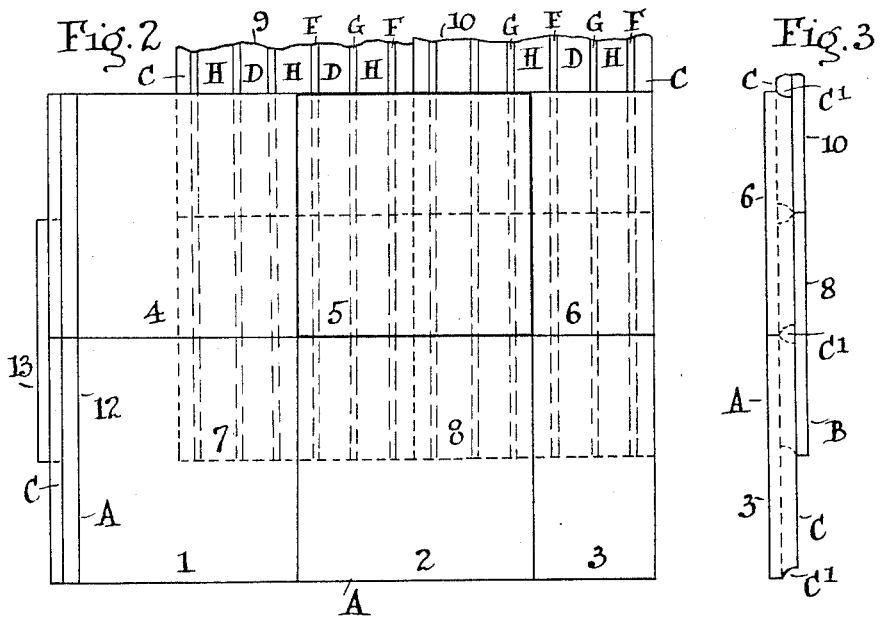
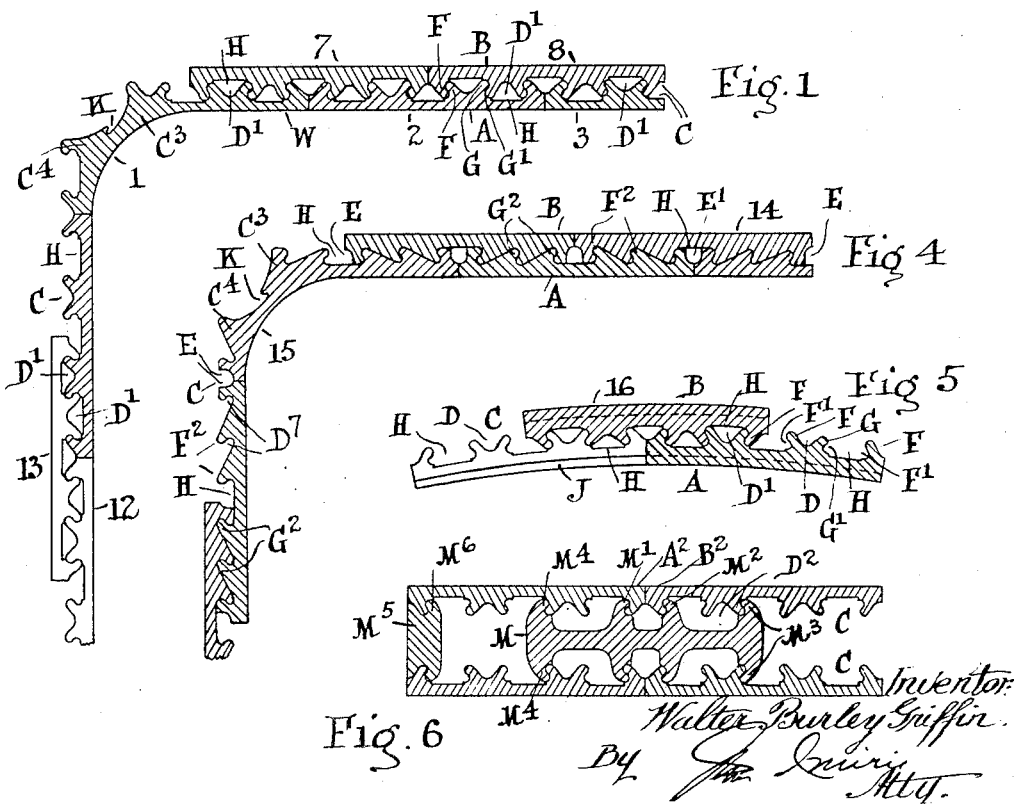

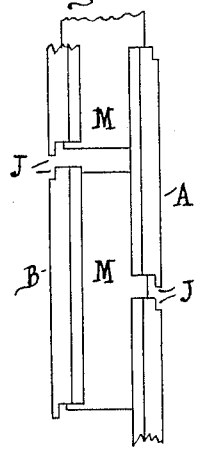
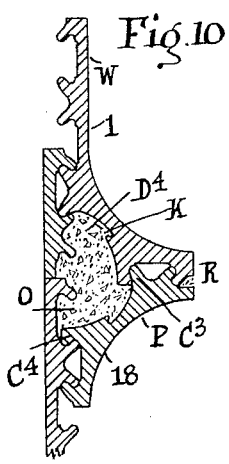
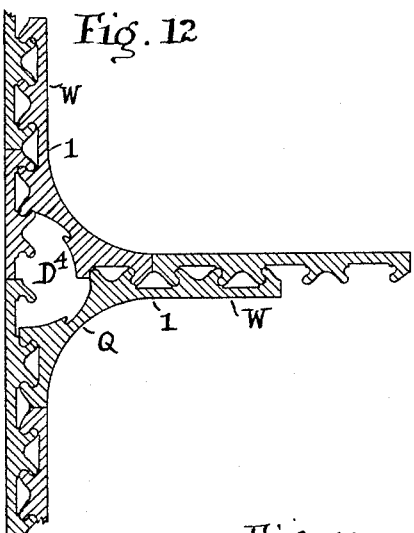
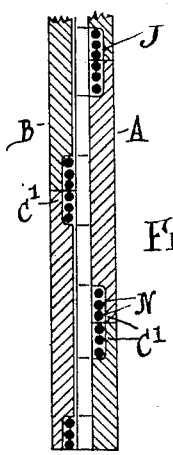
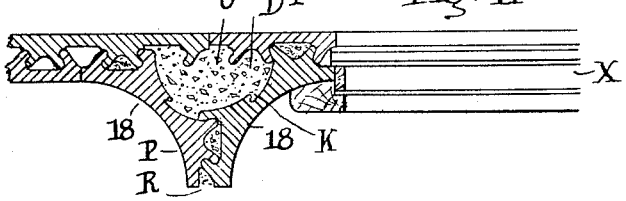
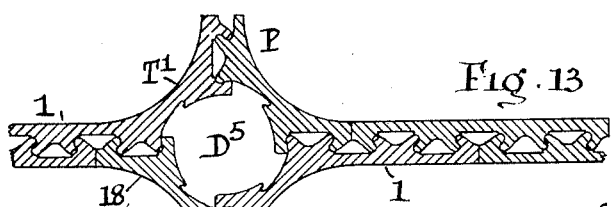
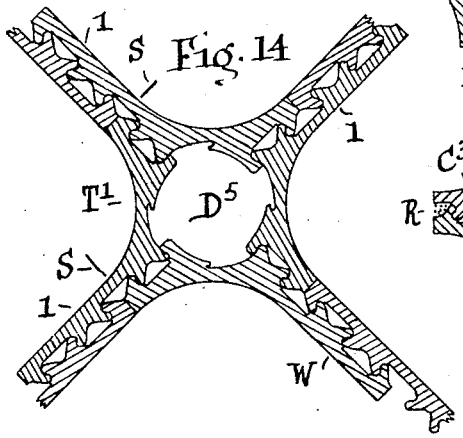
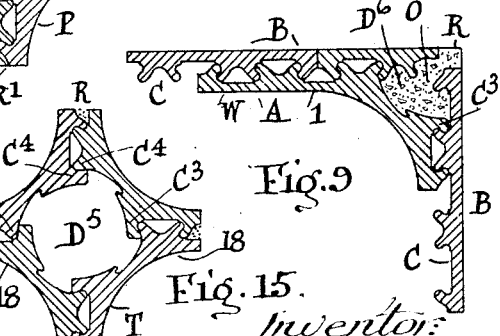

UNITED STATES PATENT OFFICE.

WALTER BURLEY GRIFFIN, OF MELBOURNE, VICTORIA, AUSTRALIA.

BUILDING COMPONENT.

1,381,823.  Specification of Letters Patent.  Patented June 14, 1921.

Application filed April 30, 1918. Serial No. 231,704.

*To all whom it may concern:*

Be it known that I, WALTER BURLEY GRIFFIN, a citizen of the United States of America, residing at 395 Collins street, Melbourne, in the State of Victoria, Commonwealth of Australia, have invented certain new and useful Improvements in and Relating to Building Components; and I do hereby declare the following to be a full, clear, and exact description of the invention, such as will enable others skilled in the art to which it appertains to make and use the same.

This invention relates to components to be built in interlocking courses to produce walls, ceilings, linings, floors, fences, casings, and other parts and envelopment of building, mechanical, and other constructions including models and toys. These components are termed tiles, building blocks, segments and so on, and are of concrete ferro-concrete, clay, glass, cork insulation, celluloid, rubber, wood, metal, or other material or materials. The segments will be made of sizes and forms adapted to begin, form bodies of, strengthen and finish required structures—to border window, door and other openings—and so on. Structures intended to be temporary can be disassembled the segments being slidable.

My segments may be apertured and cut to fractional sizes before or after assembling without destroying their interlocking or binding features. They can be capped or edged to form tops of walls, or where jambs, sills, or lintels are required. Metal segments can be combined with wooden or clay-tile segments and so on.

My integrated construction is ordinarily hollow or has cavities and is formed of two opposed (namely outer and inner) courses of segments which are vertebrated and continuously articulated as hereinafter described and have lapped edge joints. With this object I provide on one face of each segment certain parallel recesses which are alongside of and are partly inclosed by parallel ribs. There is an outer and an inner course of these segments, within one form of my construction their ribbed and recessed faces interlocking, and with edges of outer segments located opposite solid portions of inner segments, so that the integrated construction displays imbrication. The segments will be further bound together or be insulated in some cases by metal reinforcement, or grouting, cement, concrete, bitumen, heat resisting material, or by putting between the segments any impregnated paper or fabric in use for insulating. It is in some cases an advantage of my construction that the structure may be comparatively small areas of the opposed surfaces in or nearly in contact, as less of the insulation material is necessary to prevent passage of moisture across from segment to segment.

Segment edges will be made to meet flush, or are rabbeted, chased, lapped, mitered, raised or of other approved design. The fractional components used to secure alinement at the terminal edge of a wall or the like are shaped to suit.

I do not consider imbricated structures having courses with interior surfaces interlocking by means of dovetailing, or segments further bound together, or with edges as aforesaid to be broadly new, but will now further explain the features of my invention.

The accompanying diagrammatic drawings illustrate examples of assembled segments, but there may be modifications and additions while retaining matter I claim. False joints not shown but well understood by builders, may be made to appear on any integrated face.

The drawings are not intended to limit me to precise designs and proportions of parts, or to the numbers shown of projections and recesses relatively to each segment. Such modifications may be made as retain substantially any combination which is hereinafter claimed.

Figure 1 shows a partly sectional plan of parts of cavity wall which meet forming a curved angle; Fig. 2 is an elevation of these parts omitting some articulation, and Fig. 3 is an end view of one wall, but with the tops and bottoms of segments chased. Fig. 4 is a sectional plan with segments modified from those of Fig. 1.

Fig. 5 shows curved segments for making vaulted ceilings, arches, and curved envelopment generally.

Fig. 6 shows a hollow wall or structure of greater thickness than those preceding and with more cavity space for insulation and for other purposes.

Fig. 7 is a section of a structure having reinforced rabbeted segment meeting edge.

Fig. 8 shows an end elevation of slightly separated parts which form the structure in Fig. 6, but without the end closer, and with rabbeted edge segments.

Fig. 9 shows a sectional plan of walls with a single angle curved within and right angled without. Figs. 10 to 15 are sectional plans, Figs. 10 and 11 each showing a wall with a half column or strengthening buttress, a window frame or the like marked X being added in Fig. 11. Fig. 12 shows abutting walls, and Fig. 13 a wall having a strengthening column. Fig. 14 shows crossed walls having an engaged column and Fig. 15 illustrates a free column.

The two course structures illustrated have internal cavities to be left so in some cases and in other cases to be utilized for ventilation, tubing, or other structural members. They are in some cases partly or wholly filled with concrete, Figs. 9 to 11 showing monolithic construction having greater rigidity and strength.

On the wall inner side A, in Figs. 1 to 3 square flat segments are marked 2, 5 and 12, and fractional ones (shown rectangular) are marked 3 and 6, cut to aline with the segment 8 on the wall outer side B, which has square flat segments 7, 8, 9, 10, and 13. Segment 7 interlocks with segments 1, 2, 4, and 5 by means of oppositely engaging continuous projections or parallel ribs F, G, and alternating parallel recesses D, H, on their interior faces C and forms parallel continuous cavities $D^1$ in Fig. 1. Cavities $D^2$ in Fig. 6 are modifications. There are corner cavities $D^6$, Fig. 9, column cavities $D^5$, Figs. 13 to 15, and buttress (or half-column) cavities $D^4$, Figs. 10 to 12. I do not claim as new the use of interior dovetailed recesses on wall plates to receive concrete or the like for keying.

Tops and bottoms of segments are chased in some cases to receive binding material as at $C^1$, Figs. 3 and 7; and at E, Fig. 4 vertical edges are shown chased forming wall cavities $E^1$ which can be filled with binding or reinforcing material. Chased edges can engage frames of doors, sashes, or the like. J in Figs. 5 and 7 indicates rabetted edges of segments.

Each segment has from edge to edge the aforesaid parallel ribs and recesses, which in Fig. 2 are indicated only as to segments 7, 8, 9 and 10. The center lines of the ribs extend in inclined planes, as appears for example in Fig. 5, so that it may be said there are converging ribs F and G between which are partly inclosed parallel recesses $F^1$ $G^1$ forming the ends of the relatively wide recesses H. Certain ribs F and G are diverging and between these are the relatively narrow recesses D, that is they are of less width than recesses H. The cavities at recesses H become reduced however to cavities $D^1$ when opposed components are integrated so that ribs F and G have occupied recess H.

The ribs of each segment have rounded edges, and fit in more or less loosely as may be predetermined in rounded recesses of those segments which are located with their internal faces C opposed as illustrated.

In Fig. 4 a series of ribs inclines at each side of a recess H toward that recess,—two such ribs on one side are $F^2$, and two on the other side $G^2$; and there are recesses $D^7$, to be entered by opposed ribs as illustrated. 14 is a segment in Fig. 4.

The segments shown as at 16, 17 with curved bodies may be varied to have any other suitable curves or radii. Curved segments 1, 4, 15, and 18 are for corners, angles, buttresses, columns and the like, and differ in lengths from other segments as may be predetermined.

Buttress or corner segments extending over a curve of about 90° are marked 18; segments 1 are shown elongated and partly straight as at W the bodies of curved segments being thickened as at $C^3$, $C^4$ intermediately of each end to carry ribs and recesses suitably located to allow opposed flat, or curved, or partly flat and partly curved, segments to interlock therewith as illustrated. In Fig. 7 reinforcing rods or wires are marked N.

A free column is marked T, an engaged column $T^1$, and buttress projections P, modified at Q by being continued into an abutting wall. O indicates concrete filling in cavities. Part K is shown shaped for keying concrete O.

Instead of using concrete or other filling at segment ends as R, the ends are in some cases modified as at $R^1$ to omit cavities.

Lines S indicate where by terminating walls in Fig. 14 buttress projections would be formed. M shows a combined spreader and binder of opposed segments. The spreader has projections $M^1$ $M^2$ $M^3$ $M^4$ at each side. $M^5$ is an end closer with projections $M^6$ to enter segment recesses and lock therein more or less loosely as predetermined, allowing for example of being cemented in. $A^2$ and $B^2$ are segment ends locked together by the projections $M^1$ and $M^2$.

Having described this invention, what is claimed by Letters Patent is:—

1. A wall structure made up of oppositely arranged plate-like sections, with each plate-like section formed on its inner face with spaced ribs, each rib being formed beyond the plate to provide two divergent portions, the divergent portions of adjacent ribs projecting toward each other to form the space intermediate the ribs as a complement of the rib, so that in the coöperation of the sections, the rib of one section accurately fits the space between the ribs of the other section, the divergent portions of each rib providing a space between such rib and the adjacent section when the sections are assembled.

2. A wall structure comprising oppositely arranged vertical sections having straight portions and horizontally curved portions, the horizontally curved portions forming a hollow space for the reception of cementitious material, the sections having vertical pairs of ribs, each pair of ribs having a common base, the bases being spaced to form large recesses, the ribs in each pair diverging to provide V-shaped grooves, the ribs of one section fitting in the ribs of the recesses of the other section, the curved portions of the sections having their material thickened at their vertical edges so that the joint may be continued.

In witness whereof I have hereunto set my hand.

WALTER BURLEY GRIFFIN.